(12) United States Patent
Kim

(10) Patent No.: US 7,927,447 B2
(45) Date of Patent: Apr. 19, 2011

(54) PROTECTIVE MATERIALS AND METHODS FOR PRODUCING PROTECTIVE MATERIALS

(75) Inventor: Daniel Kim, Portland, OR (US)

(73) Assignee: Finn Tech, Inc., Las Vegas, NV (US)

( * ) Notice: Subject to any disclaimer, the term of this patent is extended or adjusted under 35 U.S.C. 154(b) by 654 days.

(21) Appl. No.: 11/805,650

(22) Filed: May 23, 2007

(65) Prior Publication Data
US 2008/0290556 A1 Nov. 27, 2008

(51) Int. Cl.
*B32B 38/04* (2006.01)
*A41D 27/26* (2006.01)

(52) U.S. Cl. ............. 156/254; 156/245; 156/292; 2/267

(58) Field of Classification Search .................. 156/491, 156/267; 2/16, 463, 464, 465; 428/158–160
See application file for complete search history.

(56) References Cited

U.S. PATENT DOCUMENTS

| | | | |
|---|---|---|---|
| 2,821,244 A | | 1/1958 | Beck |
| 2,865,046 A | * | 12/1958 | Bird .............. 264/46.3 |
| 2,915,785 A | * | 12/1959 | Valentini ............ 264/129 |
| 3,285,768 A | * | 11/1966 | Habib .............. 428/160 |
| 3,594,817 A | | 7/1971 | Kelly |
| 4,197,342 A | | 4/1980 | Bethe |
| 4,474,840 A | | 10/1984 | Adams |
| 4,655,868 A | * | 4/1987 | Hefele ............. 156/238 |
| 4,663,211 A | | 5/1987 | Kon |
| 4,731,139 A | * | 3/1988 | Feyerabend et al. ....... 156/154 |
| 5,242,519 A | * | 9/1993 | Wu ................. 156/154 |
| 5,325,537 A | * | 7/1994 | Marion ............. 2/462 |
| 5,551,173 A | * | 9/1996 | Chambers ........... 36/44 |
| 5,887,453 A | | 3/1999 | Woods |
| 6,216,268 B1 | | 4/2001 | Schleicher |
| 6,295,654 B1 | * | 10/2001 | Farrell ............. 2/456 |
| 6,546,579 B1 | | 4/2003 | Leventhal et al. |
| 6,743,325 B1 | | 6/2004 | Taylor |
| 7,625,458 B2 | * | 12/2009 | Lin ................ 156/219 |
| 2004/0148685 A1 | | 8/2004 | Messinger |
| 2006/0043636 A1 | * | 3/2006 | Hsueh ............. 264/236 |
| 2006/0103222 A1 | | 5/2006 | Caruso et al. |
| 2006/0108853 A1 | | 5/2006 | Embach et al. |
| 2006/0127663 A1 | | 6/2006 | Strey et al. |

* cited by examiner

*Primary Examiner* — Philip C Tucker
*Assistant Examiner* — William P Bell
(74) *Attorney, Agent, or Firm* — JHK Law; Joseph Hyosuk Kim

(57) ABSTRACT

The present disclosure is directed to protective materials and methods for producing protective materials. The protective materials include a plurality of foam elements having a molded surface and a cut surface. The molded surfaces of the foam elements are attached to a fabric sheet such that the cut surfaces each define planes that are spaced from the fabric sheet when the fabric sheet is substantially planar. The protective materials are produced by using a mold to form the plurality of foam elements on one side of a foam sheet, attaching a fabric sheet to the top of the foam elements, and cutting the foam elements from the foam sheet.

39 Claims, 5 Drawing Sheets

PROTECTIVE MATERIALS AND METHODS FOR PRODUCING PROTECTIVE MATERIALS

BACKGROUND AND SUMMARY

Protective materials are often used by people to protect themselves from bumps, cuts, abrasions, and other injury in sports and other activities. The present invention relates to resilient protective materials and methods for producing protective materials for use in products such as shin guards, helmets, baseball chest protectors, bicycle seats, chairs, shoulder pads, carry bag straps, sports bras, etc. The protective materials comprise a plurality of molded foam elements attached to a fabric sheet, and may also comprise a plurality of foam elements sandwiched between a pair of fabric sheets. The foam elements may have a selected depth and any desired shape, such as cylindrical, hexagonal, square, or any other desired shape. These protective materials may be used as components, such as liners, for safety equipment worn by a person during sports or other activities.

The method for producing the protective material comprises compressing a foam sheet against a mold having a plurality of internal cavities to form a compressed foam sheet having a plurality of foam elements formed in the cavities extending therefrom, each foam element having a molded surface with a top portion distal from the compressed foam sheet. The method further comprises attaching a fabric sheet to the top portions of the foam elements, and subsequently cutting the foam elements from the compressed foam sheet to produce the protective material. In some embodiments, another foam sheet may subsequently be attached to cut surfaces of the foam elements after the foam elements have been cut from the compressed foam sheet. The advantages of the present technology will be understood more readily after consideration of the drawings and the detailed description of the preferred embodiments.

BRIEF DESCRIPTION OF THE DRAWINGS

Embodiments of the various aspects of the present invention will be described with reference to the drawing figures as set forth below.

DETAILED DESCRIPTION AND BEST MODE OF THE INVENTION

The present invention is directed to flexible protective materials and methods for producing such protective materials. The materials and methods are described below with reference to FIGS. 1-14. The protective materials and apparatus used to make the protective materials may include one or more components, and have any suitable size and shape, consistent with their function(s).

Figure 1:
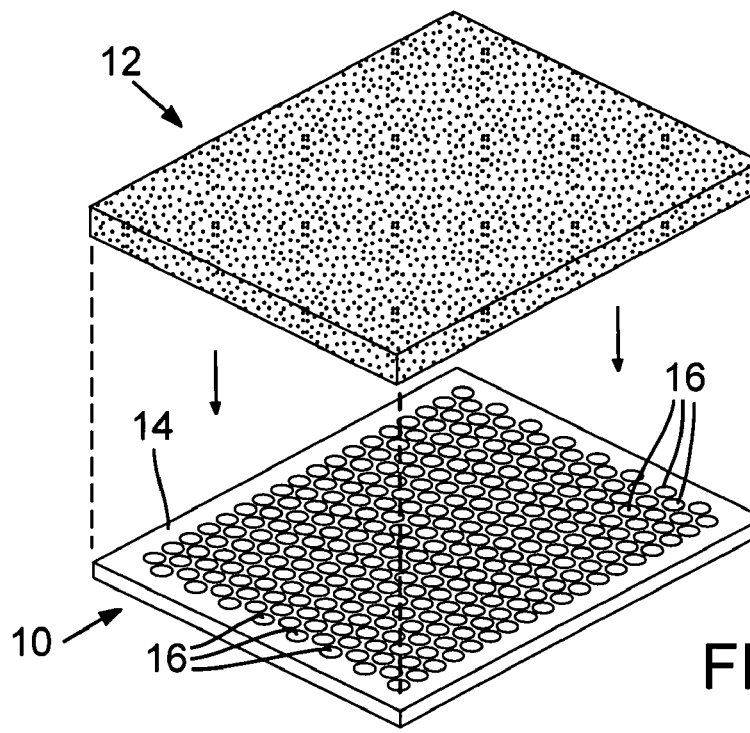
FIG. 1 is an isometric view of a mold and a sheet of foam material positioned above the mold.
Figure 2:
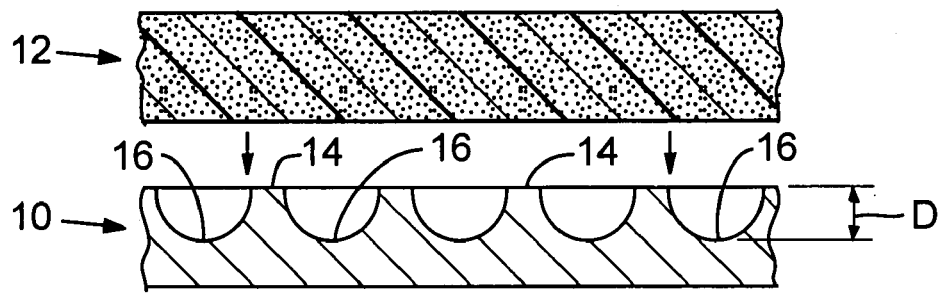
FIG. 2 is a sectional side view of a mold and a sheet of foam material positioned above the mold.

FIGS. 1-2 diagrammatically show a mold 10 with a sheet of foam material 12 positioned over the mold. The mold is configured for molding a plurality of foam elements, having desired sizes and shapes, from foam materials. The mold includes a surface 14 with a plurality of cavities, or indentations, 16 spaced along the surface. The surface 14 of the mold may have any suitable size and shape for receiving a foam sheet. For example, the surface may be a substantially planar surface for receiving a substantially planar foam sheet, as best shown in FIG. 1. The cavities 16 of the mold may be of a selected size and shape corresponding to the desired size and shape of foam elements to be formed. As shown in FIG. 2, the cavities do not extend all the way through the mold, but instead are configured to have a depth D corresponding to the desired depth of foam elements to be formed. Any number of cavities may be positioned along the surface of the mold, and these cavities are oriented along the surface to form a selected pattern. For example, the plurality of cavities may be uniformly spaced along the surface to form a homogenous pattern, as shown in FIG. 1. Alternatively, the cavities may be unevenly spaced along the surface to form a heterogeneous pattern. The cavities may also be tightly or loosely spaced, as desired, in order to form protective materials having foam elements that are more or less densely spaced, respectively.

Portions of the mold, such as the surface and/or the cavities, may be made of thermally conductive material to enable selective control of the temperature of the surface and/or the cavities. For example, the surface and/or cavities may be made of metal, ceramic, thermally conductive polymers, a composite of different materials, or the like, and may be attached to a temperature control assembly that enables selective adjustment of the temperature of the surface and/or cavities. Suitable temperature control assemblies may include a controllable heat source and/or heat sink that respectively allow for selective heating and/or cooling of the surface and/or cavities. Alternatively or additionally, the surface and/or cavities may be made of electrically resistant materials to enable selective heating of the mold with an applied electrical potential.

The foam sheet 12 may be made of any visco-elastic foam material capable of being molded into a desired shape, absorbing sufficient impact to be useful as a protective material, returning to its molded form after absorbing an impact, and continuing to return to its molded form despite the absorption of repeated impacts. The foam material thus may be selected based on its moldability, viscosity, and elasticity as determined by the type of foam material, and the foam material's density, cell count, open vs. closed cellular structure, indentation force deflection, etc. The foam may comprise such materials as EVA, polyethylene (PE), polyurethane (PU), and/or polyvinyl (PV), amongst others.

Figure 3:
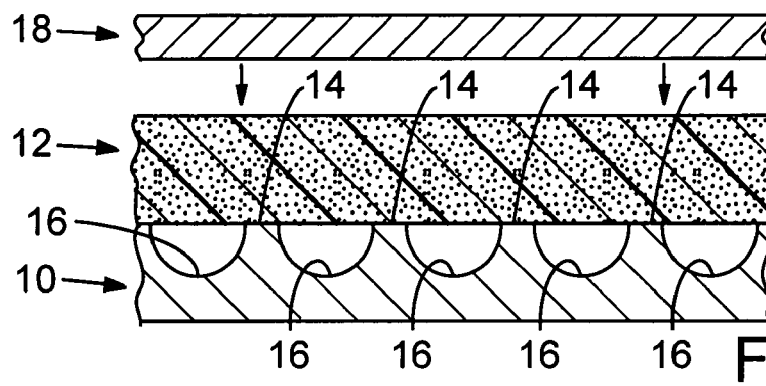
FIG. 3 is a sectional side view of a mold with a foam sheet placed on top of the mold, and a platen or press positioned over the foam sheet.
Figure 4:
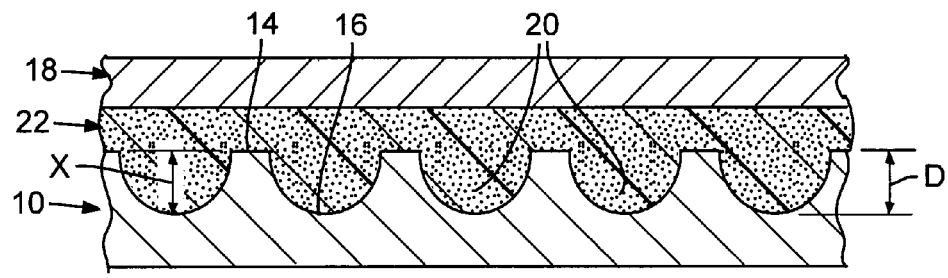
FIG. 4 is a sectional side view of a press compressing a foam material against a mold.

As shown in FIGS. 3-4, foam sheet 12 may be placed onto surface 14 of mold 10 so that the foam sheet covers one or more of cavities 16. A suitable platen, or press, 18 is operated to extend downwardly to compress the foam material against the surface of the mold. As with the mold, the press may be made of thermally conductive and/or electrically resistant material(s) that enable selective control of the temperature of the press, such as with a temperature control assembly and/or an applied potential. When the foam material is compressed against the surface of the mold, portions of the foam material may at least partially fill the cavities to form a plurality of molded foam elements 20 extending from one side of a compressed foam sheet 22. Depending on the selected foam material, the temperature of surface 14, cavities 16, and/or press 18 may need to be adjusted during this compression step, such as by heating, in order to change permanently the physical structure of the foam material from a foam sheet to a compressed foam sheet 22 having a plurality of molded visco-elastic foam elements 20 extending therefrom. The molded foam elements formed during this compression step each are sized with a shape, and depth X corresponding to the shape, and depth D of the cavity in which the foam element is formed. Each molded foam element includes a molded surface 24 with a top portion 26 distal from the compressed foam sheet.

Figure 5:
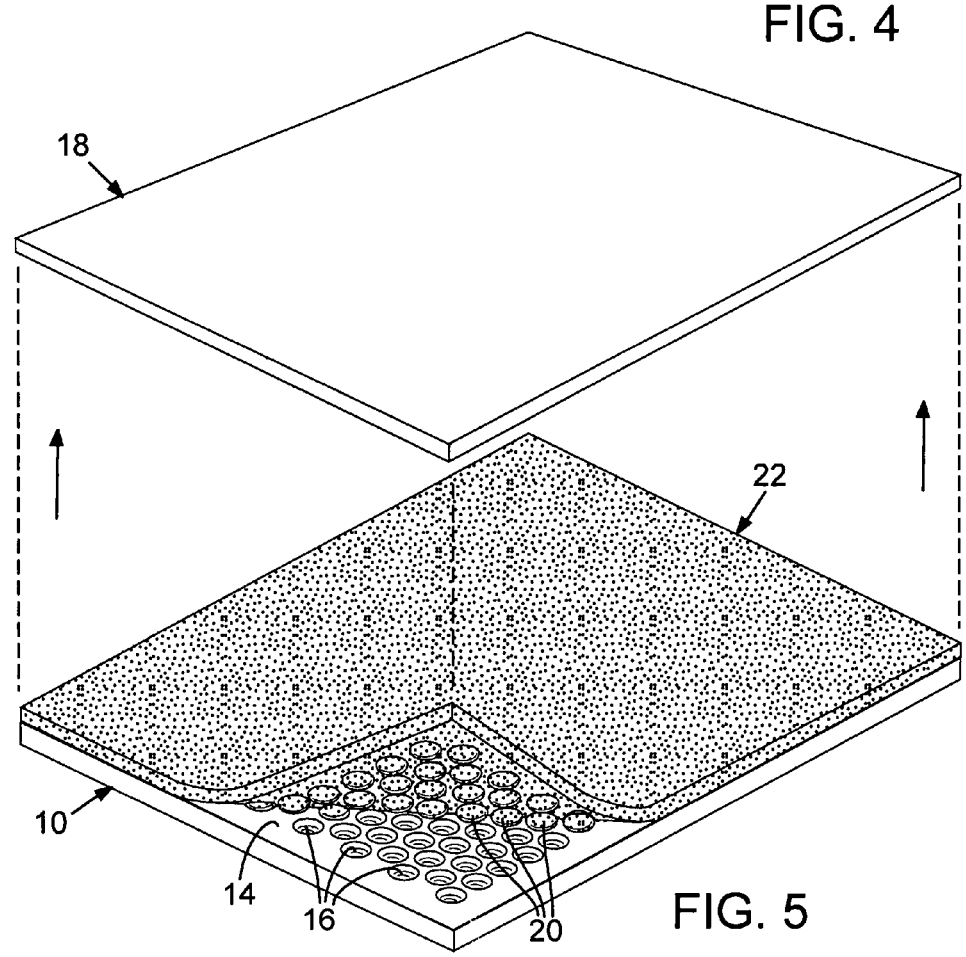
FIG. 5 is an isometric view of a press that has been lifted from a compressed foam sheet that in turn has been partially lifted from a mold to expose a plurality of molded foam elements extending from the compressed foam sheet.

After the compression step, press 18 is lifted off the compressed foam sheet 22 which is then removed from the mold 10 to expose molded foam elements 20, as shown in FIG. 5. The molded foam elements extending from the compressed foam sheet are spaced along the compressed foam sheet to form a pattern corresponding to the pattern formed by cavities 16 along surface 14 of the mold, as discussed above.

Figure 6:
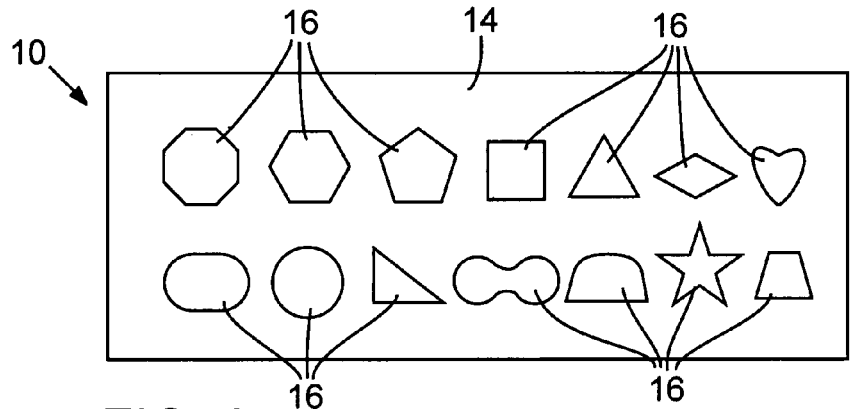
FIG. 6 is a top view of a mold having cavities with various shapes.
Figure 7:
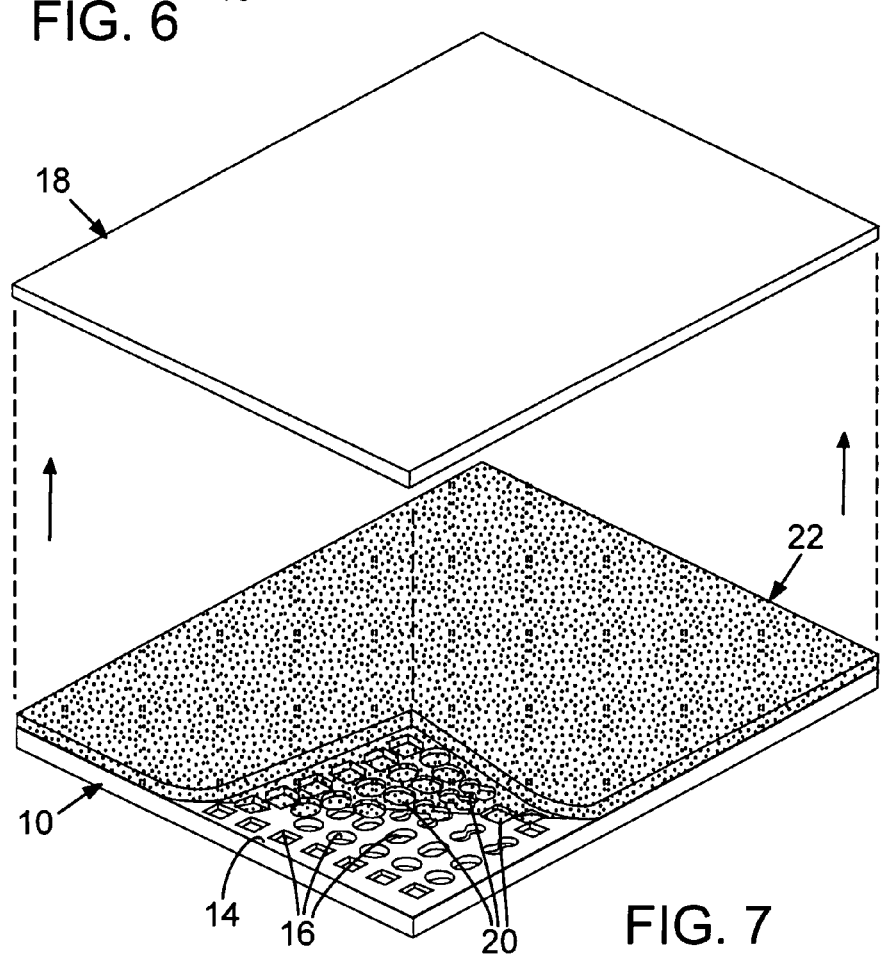
FIG. 7 is an isometric view of a compressed foam sheet that has been partially lifted from a mold to expose a plurality of molded foam elements extending from the compressed foam sheet, where the plurality of foam elements have various shapes.

As shown in FIGS. 6-7, mold 10 may include a plurality cavities 16 spaced along surface 14 where one or more cavities are shaped differently from one or more of the other cavities. For example, the shape of a cross-sectional area of any particular cavity may be a polygon (e.g. an octagon, a heptagon, a hexagon, a pentagon, a square, a rectangle a trapezoid, a diamond, a triangle, a star, etc.), a circle, an oval, an ellipse, a heart, a barbell, or any other shape. It should be appreciated that during the compression step, portions of the foam material may at least partially fill these variously shaped cavities to form molded foam elements 20 having shapes corresponding to the shapes of the cavity in which it was formed. Thus, a first foam element extending from the compressed foam sheet may have a different shape than a second foam element extending from the same compressed foam sheet. As with the cavities, the shape of a cross-sectional area of a foam element may be a polygon, a circle, an oval, an ellipse, a heart, a barbell, etc.

Figure 8:
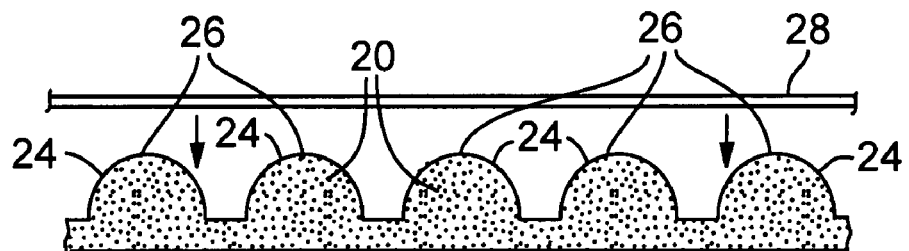
FIG. 8 is a side view of a compressed foam sheet with a plurality of molded foam elements extending therefrom, and a fabric sheet positioned above the molded foam elements.
Figure 9:
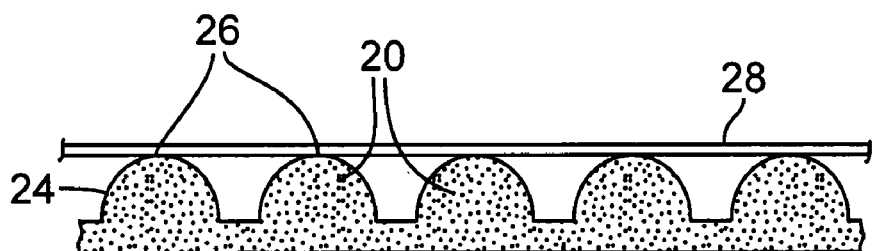
FIG. 9 is a side view of a composite material including a compressed foam sheet with a plurality of molded foam elements extending therefrom, and a fabric sheet attached to the foam elements.

As shown in FIGS. 8-9, a fabric sheet 28 is placed on top of the molded foam elements 20, and is attached to the top portions 26 of the molded surfaces 24. The fabric sheet may be any knit or woven fabric made of any suitable natural or synthetic material, such as silk, wool, cotton, linen, hemp, rayon, tencel, polyester, nylon, polypropylene, polyethylene, and/or polyvinyl, etc. The material used for the fabric sheet may be selected based on the desired properties of the fabric for use as a liner, such as comfort, breathability, absorptive properties, resistance to moisture, etc. The fabric sheet may be attached to the top portions of the molded surfaces with an adhesive, and/or may be laminated to the foam elements (such as by heating the fabric sheet and/or the top portions of the molded surfaces while the fabric sheet is in contact with the top portions). As shown in FIG. 9, after attaching the fabric sheet to the top portions of the molded surfaces, the first fabric sheet 28 may be substantially planar when the compressed foam sheet 22 is substantially planar, and the fabric sheet may be spaced from the compressed foam sheet. In some embodiments, the fabric sheet may be substantially parallel to the compressed foam sheet when the compressed foam sheet is substantially planar.

Figure 10:
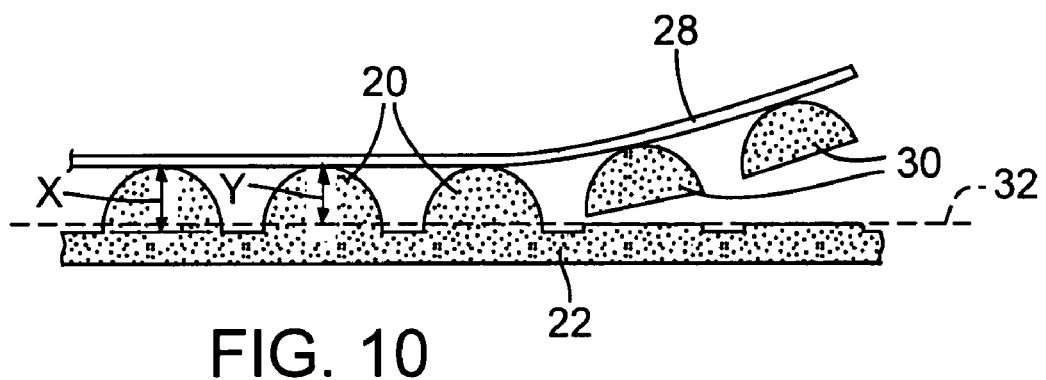
FIG. 10 is a side view of a plurality of foam elements that are attached to a fabric sheet and are being cut from a compressed foam sheet at a selected depth.
Figure 11:
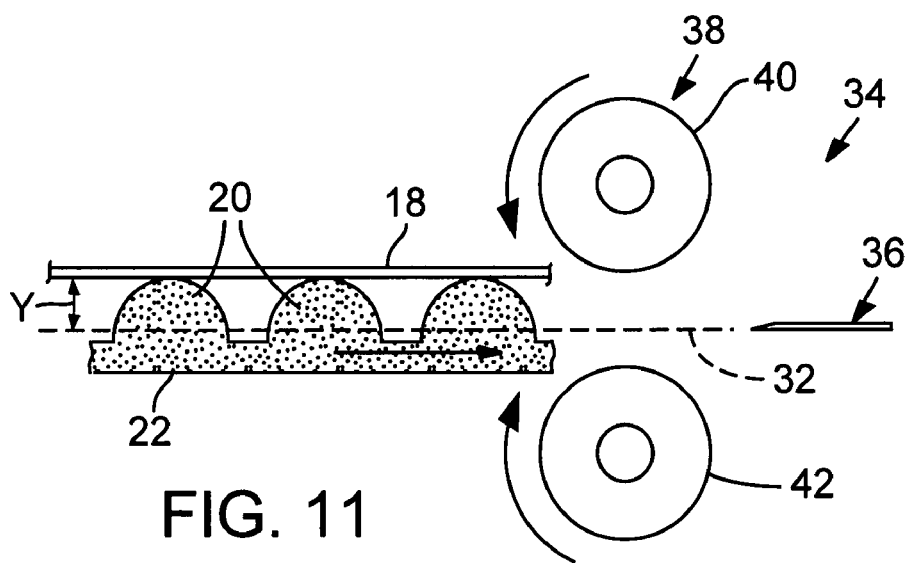
FIG. 11 is a side view of an exemplary cutting mechanism for cutting foam elements from a compressed foam sheet.

The next step involved in producing the protective foam materials of the present invention includes cutting, or slicing, the plurality of foam elements 20 from the compressed foam sheet 22, as shown in FIGS. 10-11. The cutting step includes selecting a cutting depth Y for each foam element 20, and cutting the foam elements to the selected depth to form a plurality of cut foam elements 30 attached to the fabric foam sheet 28. For example, a cut line 32 may be selected for cutting all of the foam elements attached to the fabric sheet to a uniform depth, or some foam elements may be cut to a different selected depth than other foam elements. The selected depth Y may be less than or equal to the depth X of the foam elements 20 after they have been formed in the cavities 16.

Any suitable cutting, or slicing, mechanism may be used to cut the foam elements 20 from the compressed foam sheet 22. Suitable cutting mechanisms may include a cutting tool for cutting through foam materials, and may also include a feed mechanism for guiding the foam elements into the cutting tool. FIG. 11 shows an exemplary cutting mechanism 34 that includes a slicer 36 set at a predetermined level relative to the foam elements 20, such as along cut line 32, and a feed mechanism 38 for guiding the foam elements into the slicer. The slicer may include a fixed or moving blade, such as a knife, saw blade, or the like. For example, the slicer may include a band saw blade that rotates continuously about two or more wheels (not shown) in a manner that moves the blade through a plane that coincides with the cut line. The feed mechanism may include one or more motor driven wheels, such as a wheel 40 positioned to engage the fabric sheet, and a wheel 42 positioned to engage the compressed foam sheet, where the wheel(s) rotate in a manner that guides and/or moves the foam elements into the slicer. The cutting mechanism may thereby cut through the foam elements on the opposite side of the fabric sheet to create a fabric sheet having a plurality of cut foam elements attached thereto.

Figure 12:
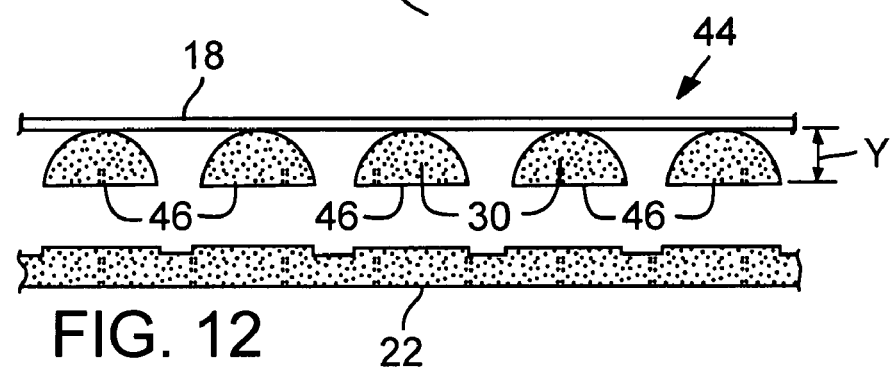
FIG. 12 is a side view of a protective material that includes a plurality of foam elements attached to a fabric sheet, where each of the foam elements have been cut from a compressed foam sheet at a selected depth.

FIG. 12 shows a composite protective material 44 that includes a plurality of cut foam elements 30 attached to the fabric sheet 18. The plurality of cut foam elements form a pattern on the first fabric sheet that corresponds to the pattern of the cavities in which the foam elements were formed (e.g. a homogeneous pattern, or a heterogeneous pattern). As discussed above, each of the cut foam elements have been cut from the compressed foam sheet 22 at a selected depth Y, and thus each foam element includes a cut surface 46 on the opposite side of the cut foam element from the fabric sheet. The cut surface of each cut foam element may define a plane that is spaced from the first fabric sheet, such as by the depth Y of that cut foam element, when the first fabric sheet is substantially planar. For example, the plane defined by the cut surface of any particular cut foam element may be substantially parallel to the first fabric sheet when the first fabric sheet is substantially planar. The protective material 44 may be used in sports and safety equipment such as shin guards, helmets, baseball chest protectors, bicycle seats, chairs, shoulder pads, carry bag straps, sports bras, etc.

Figure 13:
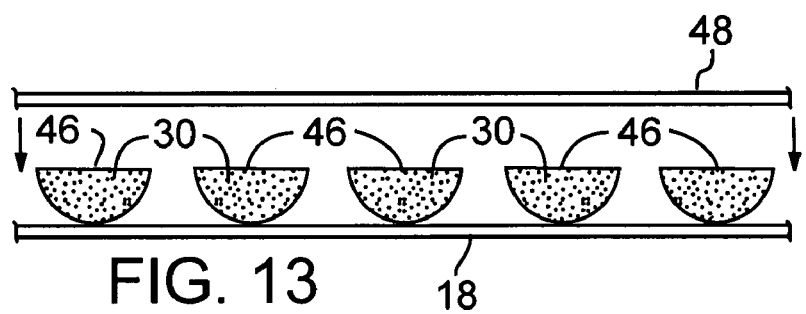
FIG. 13 is a side view of the protective material from FIG. 12 with another fabric sheet positioned above the cut surfaces of the plurality of foam elements.
Figure 14:
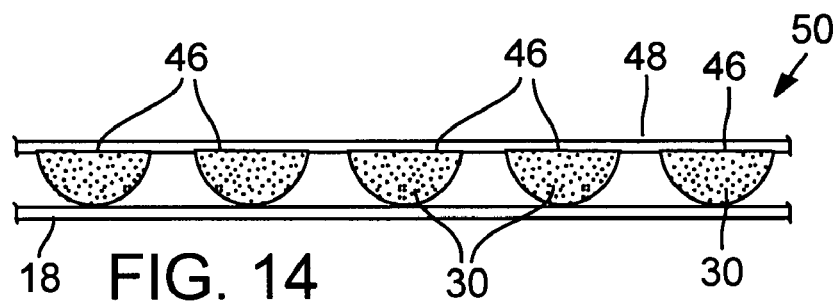
FIG. 14 is a side view of a protective material including a plurality of foam elements sandwiched between two fabric sheets.

Some protective materials according to the present invention may include a plurality of foam elements sandwiched between a pair of fabric sheets. As shown in FIGS. 13-14, a second fabric sheet 48 is attached to cut surfaces 46 of the plurality of cut foam elements 30. Specifically, the second fabric sheet may be placed on top of the cut foam elements and attached to the cut surfaces, such as with an adhesive, or by laminating the second fabric sheet to the cut surfaces, thereby forming a composite protective material 50. As with the first fabric sheet 18, the second fabric sheet 48 may be any knit or woven fabric made of any suitable natural or synthetic material, and may be selected based on the desired properties of the fabric for use as a liner, such as comfort, breathability, absorptive properties, resistance to moisture, etc. The second fabric sheet may be made of the same or a different material than the first fabric sheet, depending on the desired use of the protective material 50. Moreover, instead of a second fabric sheet, a sheet of another material may be used, such as resilient material or impact-resistant material.

As shown in FIG. 14, after attaching the second fabric sheet to the cut surfaces of the cut foam elements, the second fabric sheet is substantially planar when the first fabric sheet is substantially planar, with the second fabric sheet spaced from the first fabric sheet. In some embodiments, the second fabric sheet may be substantially parallel to the first fabric sheet when the first fabric sheet is substantially planar.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

I claim:

1. A method for producing a protective material including a plurality of foam elements attached to a fabric sheet, the method comprising: providing a mold having a surface and a plurality of cavities spaced along the surface; placing a sheet of foam material onto the surface of the mold so that the foam sheet covers the cavities; compressing the foam sheet against the surface of the mold, whereby portions of the foam material at least partially fill the cavities to form a plurality of molded foam elements on one side of the compressed foam sheet, each foam element having a molded surface with a top portion distal from the compressed foam sheet; removing the compressed foam sheet from the mold to expose the foam elements; attaching a first fabric sheet to the top portions of the molded surfaces; and cutting the plurality of foam elements from the compressed foam sheet to form the protective material, wherein the step of cutting the foam elements from the foam sheet comprises: selecting a depth of the foam elements that is less than or equal to the depth of the foam elements after the foam elements have been formed in the cavities; and cutting the foam elements to the selected depth.

2. The method of claim 1, wherein after attaching the first fabric sheet to the top portions of the molded surfaces, the first fabric sheet is substantially planar when the compressed foam sheet is substantially planar, and the first fabric sheet is spaced from the compressed foam sheet.

3. The method of claim 2, wherein after attaching the first fabric sheet to the top portions of the molded surfaces, the first fabric sheet is substantially parallel to the compressed foam sheet when the compressed foam sheet is substantially planar.

4. The method of claim 1, wherein the step of providing a mold having a surface and a plurality of cavities spaced along the surface includes providing a mold having a first cavity with a shape that is different than a second cavity.

5. The method of claim 4, wherein the step of compressing the foam sheet against the surface of the mold shape causes a first portion of the foam material to at least partially fill the first cavity to form a first molded foam element, and a second portion of the foam material to at least partially fill the second cavity to form a second foam element, wherein the first foam element has a different shape than the second foam element.

6. The method of claim 1, wherein the step of compressing the foam sheet against the surface of the mold shape causes a first portion of the foam material to at least partially fill a first cavity to form a first foam element, wherein a cross-section of the first foam element defines a shape selected from the group consisting of a circle, an ellipse, an oval, a polygon, a heart, and a barbell.

7. The method of claim 1, wherein the step of cutting the plurality of foam elements from the compressed foam sheet includes cutting a first foam element to form a cut surface defining a plane that is spaced from the first fabric sheet when the first fabric sheet is substantially planar.

8. The method of claim 7, wherein after the step of cutting the first foam element to form a cut surface, the plane defined by the cut surface is substantially parallel to the first fabric sheet when the first fabric sheet is substantially planar.

9. The method of claim 1, wherein the step of cutting the plurality of foam elements from the compressed foam sheet includes forming a cut surface on each of the foam elements, the method further comprising attaching a second fabric sheet to the cut surfaces of the foam elements so that the second fabric sheet is substantially planar when the first fabric sheet is substantially planar, and the second fabric sheet is spaced from the first fabric sheet.

10. The method of claim 9, wherein after attaching the second fabric sheet to the cut surfaces of the foam elements, the second fabric sheet is substantially parallel to the first fabric sheet when the first fabric sheet is substantially planar.

11. The method of claim 10, wherein the plurality of foam elements form a substantially homogenous pattern on the first fabric sheet.

12. The method of claim 10, wherein the plurality of foam elements form a heterogeneous pattern on the first fabric sheet.

13. The method of claim 1, wherein the step of providing a mold having a surface and a plurality of cavities spaced along the surface includes providing a mold having plurality of cavities spaced along the surface of the mold to form a pattern, and wherein after cutting the plurality of foam elements from the compressed foam sheet, the plurality of foam elements form a pattern on the first fabric sheet corresponding to the pattern of the cavities.

14. A method for producing a protective material including a plurality of foam elements attached to a fabric sheet, the method comprising: providing a mold having a surface and a plurality of cavities spaced along the surface; placing a sheet of foam material onto the surface of the mold so that the foam sheet covers the cavities; compressing the foam sheet against the surface of the mold, whereby portions of the foam material at least partially fill the cavities to form a plurality of molded foam elements on one side of the compressed foam sheet, each foam element having a molded surface with a top portion distal from the compressed foam sheet; removing the compressed foam sheet from the mold to expose the foam elements; attaching a first fabric sheet to the top portions of the molded surfaces; and cutting the plurality of foam elements from the compressed foam sheet to form the protective material, wherein the step of cutting the plurality of foam elements from the compressed foam sheet includes cutting a first foam element to form a cut surface defining a plane that is spaced from the first fabric sheet when the first fabric sheet is substantially planar.

15. The method of claim 14, wherein after attaching the first fabric sheet to the top portions of the molded surfaces, the first fabric sheet is substantially planar when the compressed foam sheet is substantially planar, and the first fabric sheet is spaced from the compressed foam sheet.

16. The method of claim 15, wherein after attaching the first fabric sheet to the top portions of the molded surfaces, the first fabric sheet is substantially parallel to the compressed foam sheet when the compressed foam sheet is substantially planar.

17. The method of claim 14, wherein the step of cutting the foam elements from the foam sheet comprises: selecting a depth of the foam elements that is less than or equal to the depth of the foam elements after the foam elements have been formed in the cavities; and cutting the foam elements to the selected depth.

18. The method of claim 14, wherein the step of providing a mold having a surface and a plurality of cavities spaced along the surface includes providing a mold having a first cavity with a shape that is different than a second cavity.

19. The method of claim 18, wherein the step of compressing the foam sheet against the surface of the mold shape causes a first portion of the foam material to at least partially fill the first cavity to form a first molded foam element, and a second portion of the foam material to at least partially fill the second cavity to form a second foam element, wherein the first foam element has a different shape than the second foam element.

20. The method of claim 14, wherein the step of compressing the foam sheet against the surface of the mold shape causes a first portion of the foam material to at least partially fill a first cavity to form a first foam element, wherein a cross-section of the first foam element defines a shape selected from the group consisting of a circle, an ellipse, an oval, a polygon, a heart, and a barbell.

21. The method of claim 14, wherein after the step of cutting the first foam element to form a cut surface, the plane defined by the cut surface is substantially parallel to the first fabric sheet when the first fabric sheet is substantially planar.

22. The method of claim 14, wherein the step of cutting the plurality of foam elements from the compressed foam sheet includes forming a cut surface on each of the foam elements, the method further comprising attaching a second fabric sheet to the cut surfaces of the foam elements so that the second fabric sheet is substantially planar when the first fabric sheet is substantially planar, and the second fabric sheet is spaced from the first fabric sheet.

23. The method of claim 22, wherein after attaching the second fabric sheet to the cut surfaces of the foam elements, the second fabric sheet is substantially parallel to the first fabric sheet when the first fabric sheet is substantially planar.

24. The method of claim 23, wherein the plurality of foam elements form a substantially homogenous pattern on the first fabric sheet.

25. The method of claim 23, wherein the plurality of foam elements form a heterogeneous pattern on the first fabric sheet.

26. The method of claim 14, wherein the step of providing a mold having a surface and a plurality of cavities spaced along the surface includes providing a mold having plurality of cavities spaced along the surface of the mold to form a pattern, and wherein after cutting the plurality of foam elements from the compressed foam sheet, the plurality of foam elements form a pattern on the first fabric sheet corresponding to the pattern of the cavities.

27. A method for producing a protective material including a plurality of foam elements attached to a fabric sheet, the method comprising: providing a mold having a surface and a plurality of cavities spaced along the surface; placing a sheet of foam material onto the surface of the mold so that the foam sheet covers the cavities; compressing the foam sheet against the surface of the mold, whereby portions of the foam material at least partially fill the cavities to form a plurality of molded foam elements on one side of the compressed foam sheet, each foam element having a molded surface with a top portion distal from the compressed foam sheet; removing the compressed foam sheet from the mold to expose the foam elements; attaching a first fabric sheet to the top portions of the molded surfaces; and cutting the plurality of foam elements from the compressed foam sheet to form the protective material, wherein the step of cutting the plurality of foam elements from the compressed foam sheet includes forming a cut surface on each of the foam elements, the method further comprising attaching a second fabric sheet to the cut surfaces of the foam elements so that the second fabric sheet is substantially planar when the first fabric sheet is substantially planar, and the second fabric sheet is spaced from the first fabric sheet.

28. The method of claim 27, wherein after attaching the first fabric sheet to the top portions of the molded surfaces, the first fabric sheet is substantially planar when the compressed foam sheet is substantially planar, and the first fabric sheet is spaced from the compressed foam sheet.

29. The method of claim 28, wherein after attaching the first fabric sheet to the top portions of the molded surfaces, the first fabric sheet is substantially parallel to the compressed foam sheet when the compressed foam sheet is substantially planar.

30. The method of claim 27, wherein the step of cutting the foam elements from the foam sheet comprises: selecting a depth of the foam elements that is less than or equal to the depth of the foam elements after the foam elements have been formed in the cavities; and cutting the foam elements to the selected depth.

31. The method of claim 27, wherein the step of providing a mold having a surface and a plurality of cavities spaced along the surface includes providing a mold having a first cavity with a shape that is different than a second cavity.

32. The method of claim 31, wherein the step of compressing the foam sheet against the surface of the mold shape causes a first portion of the foam material to at least partially fill the first cavity to form a first molded foam element, and a second portion of the foam material to at least partially fill the second cavity to form a second foam element, wherein the first foam element has a different shape than the second foam element.

33. The method of claim 27, wherein the step of compressing the foam sheet against the surface of the mold shape causes a first portion of the foam material to at least partially fill a first cavity to form a first foam element, wherein a cross-section of the first foam element defines a shape selected from the group consisting of a circle, an ellipse, an oval, a polygon, a heart, and a barbell.

34. The method of claim 27, wherein the step of cutting the plurality of foam elements from the compressed foam sheet includes cutting a first foam element to form a cut surface defining a plane that is spaced from the first fabric sheet when the first fabric sheet is substantially planar.

35. The method of claim 34, wherein after the step of cutting the first foam element to form a cut surface, the plane defined by the cut surface is substantially parallel to the first fabric sheet when the first fabric sheet is substantially planar.

36. The method of claim 27, wherein after attaching the second fabric sheet to the cut surfaces of the foam elements, the second fabric sheet is substantially parallel to the first fabric sheet when the first fabric sheet is substantially planar.

37. The method of claim 36, wherein the plurality of foam elements form a substantially homogenous pattern on the first fabric sheet.

38. The method of claim 36, wherein the plurality of foam elements form a heterogeneous pattern on the first fabric sheet.

39. The method of claim 27, wherein the step of providing a mold having a surface and a plurality of cavities spaced along the surface includes providing a mold having plurality of cavities spaced along the surface of the mold to form a pattern, and wherein after cutting the plurality of foam elements from the compressed foam sheet, the plurality of foam elements form a pattern on the first fabric sheet corresponding to the pattern of the cavities.

\* \* \* \* \*